United States Patent [19]

Tilles et al.

[11] 3,928,436
[45] Dec. 23, 1975

[54] CARBAMOYL SULFOXIDE DERIVATIVES
[75] Inventors: Harry Tilles, El Cerrito; John E. Casida, Berkeley, both of Calif.
[73] Assignee: Stauffer Chemical Company, Westport, Conn.
[22] Filed: June 18, 1973
[21] Appl. No.: 371,328

Related U.S. Application Data
[63] Continuation-in-part of Ser. No. 280,373, Aug. 14, 1972, abandoned.

[52] U.S. Cl...... 260/551 R; 260/455 A; 260/607 A; 71/100; 71/103
[51] Int. Cl.² ........................................ C07C 147/11
[58] Field of Search........................... 260/551, 479

Primary Examiner—Harry I. Moatz
Attorney, Agent, or Firm—Daniel C. Block

[57] ABSTRACT

Herbicidal active sulfoxide and sulfone compounds are described herein. The compounds have the following generic formula:

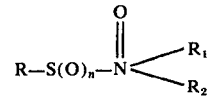

wherein $n$ is 1 or 2; R is selected from the group consisting of lower alkyl, haloalkyl, alkoxyalkenyl and alkenyl; $R_1$ and $R_2$ can be the same or different and can be selected from the group consisting of lower alkyl, cycloalkyl, alkylcycloalkyl, alkenyl and alkynyl.

56 Claims, No Drawings

CARBAMOYL SULFOXIDE DERIVATIVES

CROSS-REFERENCE TO RELATED APPLICATION

This application is a continuation-in-part of application Ser. No. 280,373 filed Aug. 14, 1972 now abandoned.

DESCRIPTION OF THE INVENTION

This invention is directed to a novel group of compounds which may be generally described as sulfoxide and sulfone derivatives of thiocarbamates which are highly active herbicides. The compounds of the present invention are represented by the generic formula:

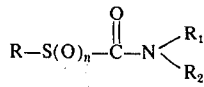

wherein $n$ can be 1 or 2; R can be selected from the group consisting of lower alkyl, haloalkyl, alkoxyalkenyl and alkenyl; $R_1$ and $R_2$ can be the same or different and can be selected from the group consisting of lower alkyl, cycloalkyl having 3–8 carbon atoms, alkylcycloalkyl, alkenyl and alkynyl.

The above-noted compounds can be prepared by reacting an oxidizing agent such as peracetic acid or m-chloroperoxybenzoic acid with a thiocarbamate compound corresponding to the following formula:

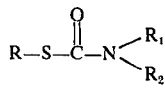

wherein R, $R_1$ and $R_2$ have been defined above. The reaction is carried out in the presence of an inert solvent such as chloroform, methylene chloride, benzene, and toluene, and at a temperature of from about −25°C. to about 60°C. The amount of oxidizing agent used must be at least one molar equivalent to form the sulfoxide derivative and at least two molar equivalents to form the sulfone derivatives. The reaction is completed when no oxidizing agent is left within the reaction mass.

The thiocarbamate compounds are known herbicides and their method of synthesis is known; see U.S. Pat. Nos. 2,913,327, 2,983,747, 3,133,947, 3,175,897 and 3,185,720 for example. However, the use of these thiocarbamates as reactive intermediates to form other compounds that have pesticidal activity is unexpected.

In order to illustrate the merits of the present invention, the following examples are provided:

EXAMPLE 1

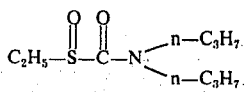

A mixture was formed which contained 12.2 g. (0.06 mole) of m-chloroperoxybenzoic acid in 200 cc. of chloroform. This solution was then cooled in an ice bath to 3°C. Then, 9.5 g. (0.05 mole) of S-ethyl dipropylthiocarbamate was rapidly added and the temperature rose rapidly to 35°C. and then decreased. The flask containing the reaction mixture was placed under refrigeration for about an hour wherein white solid crystals were observed. The solution was kept under refrigeration for 24 hours and then was filtered while in the cold condition. It was then washed with chloroform and then was dried. The combined filtrate was washed with 3 portions of 100 cc. of 5% sodium carbonate solution, 1 portion of 100 cc. of water, dried over magnesium sulfate and concentrated on a rotary evaporator under water pump vacuum, to yield 10.1 g. of product, $n_D^{30}$ - 1.4834.

EXAMPLE 2

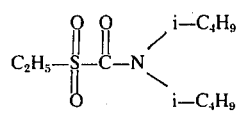

A solution was formed containing 17.2 g. of m-chloroperoxybenzoic acid in 200 cc. of methylene chloride. Thereafter, 10.9 g. (0.05 mole) of S-ethyl diisobutylthiocarbamate was added rapidly when the temperature of the solution was 18°C. The solution rose rapidly to a temperature of 30°C., wherein the reaction mass was placed in an ice bath to reduce the temperature. After a period of 3 hours the cold mixture was filtered and the cake was washed with 2 portions of 25 cc. of methylene chloride. The combined filtrate was washed with 4 portions of 100 cc. of 5% solution of sodium carbonate, then 2 portions of 100 cc. of water, dried over magnesium sulfate and concentrated in a rotary evaporator under water pump vacuum to yield 11.0 g. of product, $n_D^{30}$ - 1.4718.

EXAMPLE 3

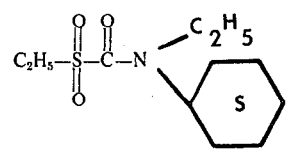

A solution was formed in a reaction vessel which contained 22.3 g. (0.11 mole) of m-chloroperoxybenzoic acid in 300 cc. of methylene chloride. Then, 10.8 g. (0.05 mole) of S-ethyl cyclohexylethylthiocarbamate was added rapidly when the temperature was 35°C. The temperature rose to 41°C., wherein the temperature began to decrease and additional heat was applied to maintain the temperature of 41°C. The cold mixture was filtered and the cake was washed with 2 portions of 25 cc. of methylene chloride. The combined filtrate was washed with 4 portions of 100 cc. of 5% sodium carbonate solution and then 2 portions of 100 cc. of water, dried over magnesium sulfate and concentrated in a rotary evaporator, first under water pump vacuum and finally under high vacuum to produce 11.9 g. of product, $n_D^{30}$ - 1.4911.

EXAMPLE 4

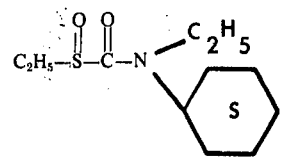

A solution was formed containing 11.2 g. (0.055 mole) of m-chloroperoxybenzoic acid in 200 cc. of methylene chloride. Then, 10.8 g. (0.05 mole) of S-ethyl cyclohexylethylthiocarbamate was added rapidly when the temperature was at −15.5°C. The temperature was allowed to rise to −14.5°C. and maintained for 2 hours. Thereafter, the temperature was allowed to reach 19.5°C. The mixture was filtered and the cake was washed with 2 portions of 25 cc. methylene chloride and dried in the oven. The combined filtrate was washed with 4 portions of 100 cc. of 5% solution of sodium carbonate and 2 portions of 100 cc. of water, dried over magnesium sulfate and concentrated in a rotary evaporator, first under water pump vacuum and finally under high vacuum to yield 10.4 g. of product, $n_D^{30}$ - 1.5120.

EXAMPLE 5

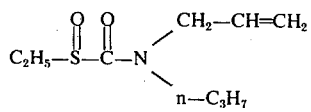

A solution was formed containing 10.7 g. of m-chloroperoxybenzoic acid in 200 cc. of methylene chloride. The solution was then placed in a dry ice bath to maintain a temperature of −16°C. Thereafter, 9.4 g. (0.05 mole) of S-ethyl allylpropylthiocarbamate was added rapidly and the temperature rose to −14.5°C. The reaction was allowed to carry out for 2 hours. During the reaction the temperature was allowed to go to 15.5°C. and thereafter was taken back down to 1°C. The mixture was filtered and the cake was washed with 2 portions of 25 cc. methylene chloride. The combined filtrate was washed with 4 portions of 100 cc. of 5% solution of sodium carbonate and 2 portions of 100 cc. of water, dried over magnesium sulfate and concentrated in a rotary evaporator, first under water pump vacuum and finally under high vacuum to yield 9.0 g. of product, $n_D^{30}$ - 1.5015.

EXAMPLE 6

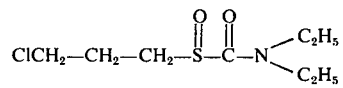

A solution was formed containing 10.7 g. (0.525 mole) of m-chloroperoxybenzoic acid in 200 cc. of methylene chloride in a reaction vessel. The solution was cooled to −16.5°C., wherein 9.3 g. (0.05 mole) of S-ethyl diallylthiocarbamate was added rapidly. Then, the solution rose to −15°C. The reaction was allowed to be carried out for 1.5 hours. At the end of this time the reaction was allowed to reach 18.5°C. The cold mixture was filtered and the cake washed with 2 portions of 25 cc. of methylene chloride. The combined filtrate was washed with 4 portions of 100 cc. of 5% sodium carbonate solution and 2 portions of 100 cc. of water, dried over magnesium sulfate and concentrated in a rotary evaporator to yield 8.8 g. of product, $n_D^{30}$ - 1.5144.

EXAMPLE 7

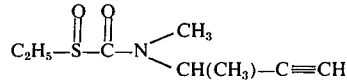

A solution was formed containing 200 cc. methylene chloride with 10.7 g. (0.0525 mole) of m-chloroperoxybenzoic acid dissolved therein. This solution was cooled to −15°C., wherein 8.6 g. (0.05 mole) of S-ethyl methyl-α-methylpropargylthiocarbamate was added rapidly. At the end of 2 hours the reaction was removed from the ice bath and allowed to reach 21.5°C., wherein the reaction was worked up in a similar manner as set forth in the previous example to yield 6.9 g. of product, $n_D^{30}$ - 1.5147.

EXAMPLE 8

$$ClCH_2-CH_2-CH_2-\overset{\overset{O}{\|}}{S}-\overset{\overset{O}{\|}}{C}-N\diagdown^{C_2H_5}_{C_2H_5}$$

A solution was formed containing 200 cc. of methylene chloride and 11.6 g. of S-3-chloropropyldiethylthiocarbamate dissolved therein. This solution was cooled to −17°C. in a dry ice bath, wherein 10.0 g. of m-chloroperoxybenzoic acid was added rapidly. After 2 hours the reaction was removed from the dry ice bath and allowed to reach 18.5°C. wherein the reaction was worked up in a similar manner as set forth in the previous example to yield 11.1 g. of product, $n_D^{30}$ - 1.5107.

Other compounds were prepared in an analogous manner starting with the appropriate starting materials as outlined above. The following is a table of compounds representative of those embodied by the present invention. Compound numbers have been assigned to them and are used for identification throughout the balance of the specification.

TABLE I $$R-S(O)_n-\overset{\overset{O}{\|}}{C}-N\diagdown^{R_1}_{R_2}$$

| Compound Number | R | $R_1$ | $R_2$ | n | Physical Constant $n_D^{30}$ or °C. |
|---|---|---|---|---|---|
| 1 | —$C_2H_5$ | n—$C_3H_7$ | n—$C_3H_7$ | 1 | 1.4834 |
| 2 | —$C_2H_5$ | i—$C_4H_9$ | i—$C_4H_9$ | 2 | 1.4718 |
| 3 | —$C_2H_5$ | n—$C_3H_7$ | n—$C_3H_7$ | 2 | 1.4574 |
| 4 | —$C_2H_5$ | i—$C_4H_9$ | i—$C_4H_9$ | 1 | 1.4834 |
| 5 | n—$C_3H_7$ | n—$C_4H_9$ | —$C_2H_5$ | 1 | 1.4847 |

TABLE I-continued $$R-S(O)_n-\overset{O}{\underset{\|}{C}}-N\begin{smallmatrix}R_1\\R_2\end{smallmatrix}$$

| Compound Number | R | R₁ | R₂ | n | Physical Constant $n_D^{30}$ or °C. |
|---|---|---|---|---|---|
| 6 | n—C₃H₇ | n—C₄H₉ | —C₂H₅ | 2 | 1.4657 |
| 7 | —C₂H₅ | (tetrahydrothiopyranyl ring) | —C₂H₅ | 2 | 1.4911 |
| 8 | —C₂H₅ | (tetrahydrothiopyranyl ring) | —C₂H₅ | 1 | 1.5122 |
| 9 | n—C₃H₇ | n—C₃H₇ | n—C₃H₇ | 1 | 1.4842 |
| 10 | n—C₃H₇ | n—C₃H₇ | n—C₃H₇ | 2 | 1.4652 |
| 11 | —C₂H₅ | —CH₂—CH=CH₂ | —CH₂—CH₂—CH₃ | 1 | 1.5015 |
| 12 | n—C₃H₇ | —C₂H₅ | —C₂H₅ | 1 | 1.4888 |
| 13 | n—C₃H₇ | —C₂H₅ | (tetrahydrothiopyranyl ring) | 1 | 1.5099 |
| 14 | —C₂H₅ | —CH₂—CH=CH₂ | —CH₂—CH=CH₂ | 1 | 1.5144 |
| 15 | —C₂H₅ | —CH₃ | —CH(CH₃)—C≡CH | 1 | 1.5147 |
| 16 | —CH₂—CH=CH₂ | —CH₂—CH=CH₂ | —CH₂—CH=CH₂ | 2 | yellow oil |
| 17 | n—C₃H₆—Cl | —C₂H₅ | —C₂H₅ | 1 | 1.5107 |
| 18 | n—C₃H₆—Cl | n—C₃H₇ | n—C₃H₇ | 1 | 1.5032 |
| 19 | —CH=CHO—C₂H₅ | n—C₃H₇ | n—C₃H₇ | 1 | 1.5082 |
| 20 | n—C₃H₆—Cl | —CH₃ | (tetrahydrothiopyranyl ring) | 1 | 82–90°C. |
| 21 | —n—C₃H₆—Cl | —C₂H₅ | —C₂H₅ | 1 | 1.5107 |
| 22 | —n—C₃H₆—Cl | —n—C₃H₇ | —n—C₃H₇ | 1 | 1.5032 |
| 23 | —n—C₃H₆—Cl | —C₂H₅ | —n—C₄H₉ | 1 | 1.5019 |
| 24 | —n—C₃H₆—Cl | —i—C₃H₇ | —i—C₃H₇ | 1 | 1.5065 |
| 25 | —n—C₃H₆—Cl | —n—C₄H₉ | —n—C₄H₉ | 1 | 1.4986 |
| 26 | —n—C₃H₆—Cl | —i—C₄H₉ | —i—C₄H₉ | 1 | 1.4977 |
| 27 | —n—C₃H₆—Cl | —C₂H₅ | (tetrahydrothiopyranyl ring) | 1 | 1.5250 |
| 28 | —n—C₄H₆ | —CH₃ | —CH₂—(tetrahydrothiopyranyl ring) | 1 | 1.5088 |
| 29 | —i—C₄H₉ | —CH₃ | —CH₂—(tetrahydrothiopyranyl ring) | 1 | 68.5–74.0°C. |
| 30 | —sec—C₄H₉ | —CH₃ | —CH₂—(tetrahydrothiopyranyl ring) | 1 | 1.5122 |
| 31 | —n—C₃H₆—Cl | —CH₃ | —CH₂—(tetrahydrothiopyranyl ring) | 1 | 1.5272 |

TABLE I-continued $$R-S(O)_n-\overset{\overset{O}{\|}}{C}-N\overset{R_1}{\underset{R_2}{\diagup}}$$

| Compound Number | R | $R_1$ | $R_2$ | n | Physical Constant $n_D^{30}$ or °C. |
|---|---|---|---|---|---|
| 32 | —CH₂—CHCl—CH₂Cl | —CH₃ | -CH₂-⟨S⟩ | 1 | Pasty solid |
| 33 | —CH(CH₂Cl)₂ | —CH₃ | -CH₂-⟨S⟩ | 1 | 1.5346 |
| 34 | —n—C₃H₇ | —i—C₃H₇ | —i—C₃H₇ | 1 | 1.4901 |
| 35 | —C₂H₅ | —n—C₄H₉ | —n—C₄H₉ | 1 | 1.4861 |
| 36 | —n—C₄H₉ | —i—C₃H₇ | —i—C₃H₇ | 1 | 1.4821 |
| 37 | —C₂H₅ | —n—C₃H₇ | —i—C₄H₉ | 1 | 1.4839 |
| 38 | —i—C₃H₇ | —n—C₃H₇ | —i—C₄H₉ | 1 | 1.4840 |
| 39 | —C₂H₅ | —C₂H₅ | —i—C₄H₉ | 1 | 1.4829 |
| 40 | —n—C₃H₇ | —i—C₄H₉ | —C₂H₅ | 1 | 1.4791 |
| 41 | —C₂H₅ | —i—C₄H₉ | —i—C₃H₇ | 1 | 1.4801 |
| 42 | —n—C₃H₇ | —i—C₃H₇ | —n—C₄H₉ | 1 | 1.4828 |
| 43 | —CH₃ | —C₂H₅ | -CH₂-⟨S⟩ | 1 | 1.5130 |
| 44 | —i—C₃H₇ | —C₂H₅ | -CH₂-⟨S⟩ | 1 | 1.5062 |
| 45 | —n—C₄H₉ | —C₂H₅ | -CH₂-⟨S⟩ | 1 | 1.5040 |
| 46 | —i—C₄H₉ | —C₂H₅ | -CH₂-⟨S⟩ | 1 | 1.5049 |
| 47 | —n—C₃H₆—Cl | —C₂H₅ | -CH₂-⟨S⟩ | 1 | 1.5168 |
| 48 | —CH₂—CHCl—CH₂Cl | —C₂H₅ | -CH₂-⟨S⟩ | 1 | 1.5288 |
| 49 | —i—C₃H₇ | —n—C₃H₇ | -CH₂-⟨S⟩ | 1 | 1.5063 |
| 50 | —n—C₄H₉ | —n—C₃H₇ | -CH₂-⟨S⟩ | 1 | 1.5009 |
| 51 | —i—C₄H₉ | —n—C₃H₇ | -CH₂-⟨S⟩ | 1 | 1.5035 |

TABLE I-continued $$R-S(O)_n-\overset{\overset{O}{\|}}{C}-N\overset{R_1}{\underset{R_2}{\diagdown}}$$

| Compound Number | R | $R_1$ | $R_2$ | n | Physical Constant $n_D^{30}$ or °C. |
|---|---|---|---|---|---|
| 52 | —sec—$C_4H_9$ | —n—$C_3H_7$ | 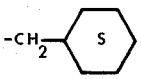 | 1 | 1.5042 |
| 53 | —n—$C_3H_6$—Cl | —n—$C_3H_7$ | 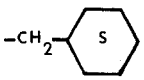 | 1 | 1.5142 |
| 54 | —$CH_2$—CHCl—$CH_2$Cl | —n—$C_3H_7$ | 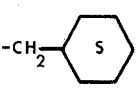 | 1 | 1.5255 |
| 55 | —n—$C_3H_7$ | —$C_2H_5$ | 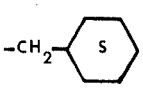 | 1 | 1.5068 |

HERBICIDAL SCREENING TESTS

As previously mentioned, the novel compounds herein described are phytotoxic compounds which are useful and valuable in controlling various plant species. Compounds of this invention are tested as herbicides in the following manner.

PRE-EMERGENCE HERBICIDE SCREENING TEST

Using an analytical balance, 20 mg. of the compound to be tested is weighed out on a piece of glassine weighing paper. The paper and compound are placed in a 30 ml. wide-mouth bottle and 3 ml. of acetone containing 1% Tween 20 is added to dissolve the compound. If the material is not soluble in acetone, another solvent such as water, alcohol or dimethylformamide (DMF) is used instead. When DMF is used, only 0.5 ml. or less is used to dissolve the compound and then another solvent is used to make the volume up to 3 ml. The 3 ml. of solution is sprayed uniformly on the soil contained in a small styrofoam flat one day after planting weed seeds in the flat of soil. A No. 152 DeVilbiss atomizer is used to apply the spray using compressed air at a pressure of 5 lb./sq. inch. The rate of application is 8 lb./acre and the spray volume is 143 gal./acre.

On the day preceding treatment, the styrofoam flat which is 7 inches long, 5 inches wide and 2.75 inches deep is filled to a depth of 2 inches with loamy sand soil. Seeds of seven different weed species are planted in individual rows using one species per row across the width of the flat. The seeds are covered with soil so that they are planted at a depth of 0.5 inch. The seeds used are hairy crabgrass (*Digitaria sanguinalis*), yellow foxtail (*Setaria glauca*), watergrass (*Echinochloa crusgalli*), red oat (*Avena sativa*), redroot pigweed (*Amaranthus retroflexus*), Indian mustard (*Brassica juncea*) and curly dock (*Rumex crispus*). Ample seeds are planted to give about 20 to 50 seedlings per row after emergence depending on the size of the plants.

After treatment, the flats are placed in the greenhouse at a temperature of 70° to 85°F. and watered by sprinkling. Two weeks after treatment, the degree of injury or control is determined by comparison with untreated check plants of the same age. The injury rating from 0 to 100% is recorded for each species as per cent control with 0% representing no injury and 100% representing complete kill.

POST-EMERGENCE HERBICIDE SCREENING TEST

Seeds of six plant species, including hairy crabgrass, watergrass, red oat, mustard, curly dock and Pinto bean (*Phaseolus vulgaris*) are planted in the styrofoam flats as described above for pre-emergence screening. The flats are placed in the greenhouse at 70°–85°F. and watered daily with a sprinkler. About 10 to 14 days after planting when the primary leaves of the bean plants are almost fully expanded and the first trifoliate leaves are just starting to form, the plants are sprayed. The spray is prepared by weighing out 20 mg. of the test compound, dissolving it in 5 ml. of acetone containing 1% Tween 20 and then adding 5 ml. of water. The solution was sprayed on the foliage using a No. 152 DeVilbiss atomizer at an air pressure of 5 lb./sq. inch. The spray concentration is 0.2% and the rate is 8 lb./acre. The spray volume is 476 gal./acre.

Injury ratings are recorded 14 days after treatment. The rating system is the same as described above for the preemergence test.

The results of these tests are shown in Table II.

TABLE II

HERBICIDAL ACTIVITY - SCREENING RESULTS

| Compound Number | Per Cent Control* at 8 lb./A | |
|---|---|---|
| | Pre-emergence | Post-emergence |
| 1 | 99.7 | 63 |
| 2 | 74 | 35 |
| 3 | 0 | 33 |
| 4 | 99 | 71 |
| 5 | 99 | 64 |
| 6 | 0 | 43 |
| 7 | 0 | 30 |
| 8 | 95 | 50 |
| 9 | 98 | 47 |
| 10 | 0 | 49 |
| 11 | 99.9 | 78 |
| 12 | 99.7 | 75 |
| 13 | 100 | 85 |
| 14 | 88 | 62 |
| 15 | 39 | 23 |
| 16 | 0 | 30 |
| 17 | 81 | 57 |
| 18 | 90 | 84 |
| 19 | 44 | 20 |
| 20 | 67 | 67 |
| 21 | 81 | 57 |
| 22 | 90 | 84 |
| 23 | 87 | 70 |
| 24 | 92 | 47 |
| 25 | 99 | 28 |
| 26 | 97 | 64 |
| 27 | 91 | 74 |
| 28 | 60 | 52 |
| 29 | 58 | 60 |
| 30 | 47 | 53 |
| 31 | 46 | 0 |
| 34 | 91 | 83 |
| 35 | 96 | 76 |
| 36 | 95 | 82 |
| 37 | 94 | 74 |
| 38 | 98 | 84 |
| 39 | 99 | 73 |
| 40 | 93 | 78 |
| 41 | 99 | 71 |
| 42 | 100 | 79 |
| 43 | 64 | 27 |
| 44 | 99 | 66 |
| 45 | 97 | 78 |
| 46 | 91 | 67 |
| 47 | 71 | 25 |
| 49 | 63 | 61 |
| 50 | 81 | 65 |
| 51 | 82 | 68 |
| 52 | 73 | 63 |
| 53 | 63 | 20 |
| 55 | 95 | 77 |

| Compound Number | Per Cent Control* at 20 lb./A | |
|---|---|---|
| | Pre-emergence | Post-emergence |
| 2 | 56 | — |
| 3 | 19 | — |
| 6 | 13 | — |
| 7 | 0 | — |
| 10 | 3 | — |
| 32 | 0 | 10 |
| 33 | 0 | 10 |
| 48 | 0 | 15 |
| 54 | 0 | 18 |

*Average for seven plant species in the pre-emergence test and for six plant species in the post-emergence test.

The compounds of the present invention can be used in any convenient form. Thus, the compounds can be made into emulsifiable liquids, emulsifiable concentrates, liquid, wettable powder, powders, granular or any other convenient form, and applied to the soil to control the undesired vegetation.

The terms lower alkyl, alkenyl and alkynyl are meant to include those compounds having straight or branched chain configurations having from 1 to 6 carbon atoms, inclusive.

What is claimed is:

1. A compound represented by the following formula:

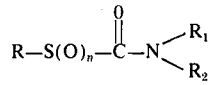

wherein $n$ is 1 or 2; R is selected from the group consisting of lower alkyl, haloalkyl, ethoxyalkenyl and alkenyl; $R_1$ and $R_2$ can be the same or different and are selected from the group consisting of lower alkyl, cycloalkyl having 3–8 carbon atoms cyclohexylmethyl, alkenyl and alkynyl, said alkyl, alkenyl and alkynyl having straight or branched chain configuration having 1–6 carbon atoms, inclusive.

2. The compound as set forth in claim 1 wherein R is —$C_2H_5$, $R_1$ is n—$C_3H_7$, $R_2$ is n—$C_3H_7$ and $n$ is 1.

3. The compound as set forth in claim 1 wherein R is —$C_2H_5$, $R_1$ is i—$C_4H_9$, $R_2$ is i—$C_4H_9$ and $n$ is 2.

4. The compound as set forth in claim 1 wherein R is —$C_2H_5$, $R_1$ is n—$C_3H_7$, $R_2$ is n—$C_3H_7$ and $n$ is 2.

5. The compound as set forth in claim 1 wherein R is —$C_2H_5$, $R_1$ is i—$C_4H_9$, $R_2$ is i—$C_4H_9$ and $n$ is 1.

6. The compound as set forth in claim 1 wherein R is n—$C_3H_7$, $R_1$ is n—$C_4H_9$, $R_2$ is —$C_2H_5$ and $n$ is 1.

7. The compound as set forth in claim 1 wherein R is n—$C_3H_7$, $R_1$ is n—$C_4H_9$, $R_2$ is —$C_2H_5$ and $n$ is 2.

8. The compound as set forth in claim 1 wherein R is -$C_2H_5$, $R_1$ is

$R_2$ is —$C_2H_5$ and $n$ is 2.

9. The compound as set forth in claim 1 wherein R is —$C_2H_5$, $R_1$ is

$R_2$ is —$C_2H_5$ and $n$ is 1.

10. The compound as set forth in claim 1 wherein R is n—$C_3H_7$, $R_1$ is n—$C_3H_7$, $R_2$ is n-$C_3H_7$ and $n$ is 1.

11. The compound as set forth in claim 1 wherein R is n—$C_3H_7$, $R_1$ is n—$C_3H_7$, $R_2$ is n—$C_3H_7$ and $n$ is 2.

12. The compound as set forth in claim 1 wherein R is —$C_2H_5$, $R_1$ is —$CH_2$-CH=$CH_2$, $R_2$ is —$CH_2$—$CH_2$—$CH_3$ and $n$ is 1.

13. The compound as set forth in claim 1 wherein R is n—$C_3H_7$, $R_1$ is —$C_2H_5$, $R_2$ is —$C_2H_5$ and $n$ is 1.

14. The compound as set forth in claim 1 wherein R is n—$C_3H_7$, $R_1$ is —$C_2H_5$, $R_2$ is

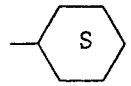

and $n$ as 1.

15. The compound as set forth in claim 1 wherein R is —$C_2H_5$, $R_1$ is —$CH_2$—CH=$CH_2$, $R_2$ is —$CH_2$—CH=$CH_2$ and $n$ is 1.

16. The compound as set forth in claim 1 wherein R is —$C_2H_5$, $R_1$ is —$CH_3$, $R_2$ is —$CH(CH_3)$—C≡CH and $n$ is 1.

17. The compound as set forth in claim 1 wherein R is —$CH_2$—CH=$CH_2$, $R_1$ is —$CH_2$—CH=$CH_2$, $R_2$ is —$CH_2$—CH=$CH_2$ and $n$ is 2.

18. The compound as set forth in claim 1 wherein R is n—$C_3H_6$—Cl, $R_1$ is —$C_2H_5$, $R_2$ is —$C_2H_5$ and $n$ is 1.

19. The compound as set forth in claim 1 wherein R is n—$C_3H_6$—Cl, $R_1$ is n—$C_3H_7$, $R_2$ is n—$C_3H_7$ and $n$ is 1.

20. The compound as set forth in claim 1 wherein R is —CH=CHO—$C_2H_5$, $R_1$ is n—$C_3H_7$, $R_2$ is n—$C_3H_7$ and $n$ is 1.

21. The compound as set forth in claim 1 wherein R is n—$C_3H_6$—Cl, $R_1$ is —$CH_3$, $R_2$ is

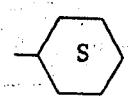

and $n$ is 1.

22. The compound as set forth in claim 1 wherein R is —n—$C_3H_6$—Cl, $R_1$ is —$C_2H_5$, $R_2$ is $C_2H_5$ and $n$ is 1.

23. The compound as set forth in claim 1 wherein R is —n—$C_3H_6$—Cl, $R_1$ is —n—$C_3H_7$, $R_2$ is —n—$C_3H_7$ and $n$ is 1.

24. The compound as set forth in claim 1 wherein R is —n—$C_3H_6$—Cl, $R_1$ is —$C_2H_5$, $R_2$ is —n—$C_4H_9$ and $n$ is 1.

25. The compound as set forth in claim 1 wherein R is —n—$C_3H_6$—Cl, $R_1$ is —i—$C_3H_7$, $R_2$ is —i—$C_3H_7$ and $n$ is 1.

26. The compound as set forth in claim 1 wherein R is —n—$C_3H_6$—Cl, $R_1$ is —n—$C_4H_9$, $R_2$ is —n—$C_4H_9$ and $n$ is 1.

27. The compound as set forth in claim 1 wherein R is —n—$C_3H_6$—Cl, $R_1$ is —i—$C_4H_9$, $R_2$ is —i—$C_4H_9$ and $n$ is 1.

28. The compound as set forth in claim 1 wherein R is —n—$C_3H_6$—Cl, $R_1$ is —$C_2H_5$, $R_2$ is

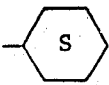

and $n$ is 1.

29. The compound as set forth in claim 1 wherein R is —n—$C_4H_6$, $R_1$ is —$CH_3$, $R_2$ is

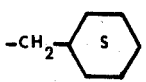

and $n$ is 1.

30. The compound as set forth in claim 1 wherein R is —i—$C_4H_9$, $R_1$ is —$CH_3$, $R_2$ is

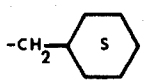

and $n$ is 1.

31. The compound as set forth in claim 1 wherein R is —sec—$C_4H_9$, $R_1$ is —$CH_3$, $R_2$ is

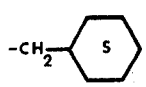

and $n$ is 1.

32. The compound as set forth in claim 1 wherein R is —n—$C_3H_6$—Cl, $R_1$ is —$CH_3$, $R_2$ is

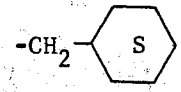

and $n$ is 1.

33. The compound as set forth in claim 1 wherein R is —$CH_2$—CHCl—$CH_2$Cl, $R_1$ is —$CH_3$, $R_2$ is

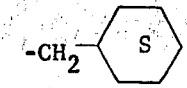

and $n$ is 1.

34. The compound as set forth in claim 1 wherein R is —CH($CH_2$Cl)$_2$, $R_1$ is —$CH_3$, $R_2$ is

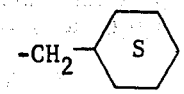

and $n$ is 1.

35. The compound as set forth in claim 1 wherein R is —n—$C_3H_7$, $R_1$ is —i—$C_3H_7$, $R_2$ is —i—$C_3H_7$ and $n$ is 1.

36. The compound as set forth in claim 1 wherein R is —$C_2H_5$, $R_1$ is —n—$C_4H_9$, $R_2$ is —n—$C_4H_9$ and $n$ is 1.

37. The compound as set forth in claim 1 wherein R is —n—$C_4H_9$, $R_1$ is —i—$C_3H_7$, $R_2$ is —i—$C_3H_7$ and $n$ is 1.

38. The compound as set forth in claim 1 wherein R is —$C_2H_5$, $R_1$ is —n-$C_3$Hhd 7, $R_2$ is —i-$C_4H_9$ and $n$ is 1.

39. The compound as set forth in claim 1 wherein R is —i—$C_3H_7$, $R_1$ is —n—$C_3H_7$, $R_2$ is —i—$C_4H_9$ and $n$ is 1.

40. The compound as set forth in claim 1 wherein R is —$C_2H_5$, $R_1$ is —$C_2H_5$, $R_2$ is —i—$C_4H_9$ and $n$ is 1.

41. The compound as set forth in claim 1 wherein R is —n—$C_3H_7$, $R_1$ is —i—$C_4H_9$, $R_2$ is —$C_2H_5$ and $n$ is 1.

42. The compound as set forth in claim 1 wherein R is -$C_2H_5$, $R_1$ is -i-$C_4H_9$, $R_2$ is -i-$C_3H_7$ and $n$ is 1.

43. The compound as set forth in claim 1 wherein R is —n—$C_3H_7$, $R_1$ is —i—$C_3H_7$, $R_2$ is —n—$C_4H_9$ and $n$ is 1.

44. The compound as set forth in claim 1 wherein R is —$CH_3$, $R_1$ is —$C_2H_5$, $R_2$ is

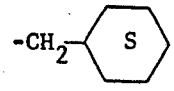

and $n$ is 1.

45. The compound as set forth in claim 1 wherein R is —i—$C_3H_7$, $R_1$ is —$C_2H_5$, $R_2$ is

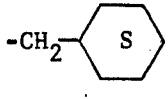

and $n$ is 1.

46. The compound as set forth in claim 1 wherein R is —n—$C_4H_9$, $R_1$ is —$C_2H_5$, $R_2$ is

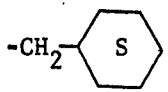

and $n$ is 1.

47. The compound as set forth in claim 1 wherein R is —i—$C_4H_9$, $R_1$ is —$C_2H_5$, $R_2$ is

-CH$_2$-⟨S⟩ and $n$ is 1.

48. The compound as set forth in claim 1 wherein R is —n—C$_3$H$_6$—Cl, R$_1$ is —C$_2$H$_5$, R$_2$ is

-CH$_2$-⟨S⟩ and $n$ is 1.

49. The compound as set forth in claim 1 wherein R is —CH$_2$—CHCl—CH$_2$Cl, R$_1$ is —C$_2$H$_5$, R$_2$ is

-CH$_2$-⟨S⟩ and $n$ is 1.

50. The compound as set forth in claim 1 wherein R is —i—C$_3$H$_7$, R$_1$ is —n—C$_3$H$_7$, R$_2$ is

-CH$_2$-⟨S⟩ and $n$ is 1.

51. The compound as set forth in claim 1 wherein R is —n—C$_4$H$_9$, R$_1$ is —n—C$_3$H$_7$, R$_2$ is

-CH$_2$-⟨S⟩ and $n$ is 1.

52. The compound as set forth in claim 1 wherein R is —i—C$_4$H$_9$, R$_1$ is —n—C$_3$H$_7$, R$_2$ is

-CH$_2$-⟨S⟩ and $n$ is 1.

53. The compound as set forth in claim 1 wherein R is 13 sec—C$_4$H$_9$, R$_1$ is —n—C$_3$H$_7$, R$_2$ is

-CH$_2$-⟨S⟩ and $n$ is 1.

54. The compound as set forth in claim 1 wherein R is —n—C$_3$H$_6$—Cl, R$_1$ is —n—C$_3$H$_7$, R$_2$ is

-CH$_2$-⟨S⟩ and $n$ is 1.

55. The compound as set forth in claim 1 wherein R is —CH$_2$—CHCl—CH$_2$Cl, R$_1$ is —n—C$_3$H$_7$, R$_2$ is

-CH$_2$-⟨S⟩ and $n$ is 1.

56. The compound as set forth in claim 1 wherein R is —n—C$_3$H$_7$, R$_1$ is —C$_2$H$_5$, R$_2$ is

-CH$_2$-⟨S⟩ and $n$ is 1.

* * * * *

UNITED STATES PATENT OFFICE
CERTIFICATE OF CORRECTION

PATENT NO. : 3,928,436

DATED : December 23, 1975

INVENTOR(S) : Harry Tilles and John E. Casida

It is certified that error appears in the above-identified patent and that said Letters Patent are hereby corrected as shown below:

ASSIGNEES: Stauffer Chemical Company, Westport, Conn.
The Regents of the University of California
Berkeley, California

UNITED STATES PATENT OFFICE
CERTIFICATE OF CORRECTION

PATENT NO. : 3,928,436
DATED : December 23, 1975
INVENTOR(S) : Harry Tilles and John E. Casida It is certified that error appears in the above-identified patent and that said Letters Patent are hereby corrected as shown below:

Claim 16 should read:

16. The compound as set forth in Claim 1 wherein R is $-C_2H_5$, $R_1$ is $-CH_3$, $R_2$ is $-CH(CH_3)-C\equiv CH$ and n is 1.

Claim 38 should read:

38. The compound as set forth in Claim 1 wherein R is $-C_2H_5$, $R_1$ is $-n-C_3H_7$, $R_2$ is $-i-C_4H_9$ and n is 1.

Claim 53 should read:

53. The compound as set forth in Claim 1 wherein R is sec-$C_4H_9$, $R_1$ is $-n-C_3H_7$, $R_2$ is

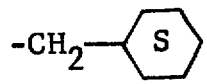

In the Abstract the formula should read:

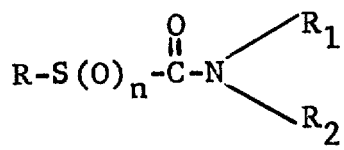

Signed and Sealed this

Twenty-eighth Day of December 1976

[SEAL]

Attest:

RUTH C. MASON
*Attesting Officer*

C. MARSHALL DANN
*Commissioner of Patents and Trademarks*